July 11, 1933.  E. KOCH  1,917,447

LUBRICATING ARRANGEMENT FOR USE IN BEARINGS

Filed April 17, 1930

Inventor:
E. Koch
By: Marks & Clerk
Attys.

Patented July 11, 1933

1,917,447

UNITED STATES PATENT OFFICE

EMIL KOCH, OF MULHEIM-RUHR, GERMANY

LUBRICATING ARRANGEMENT FOR USE IN BEARINGS

Application filed April 17, 1930, Serial No. 445,140, and in Germany April 24, 1929.

For lubricating bearing portions of shafts and axles, for example, for lubricating journals of railway rolling stock, scooping devices revolving with the axle have already been proposed which dip in a lubricant container arranged below the bearing and are provided with trough-shaped recesses for the purpose of conveying the lubricant from this container to the parts of the bearing to be lubricated. Devices of this type had the serious disadvantage—particularly at low speed of rotation—that the lubricant on the emersion of the little lubricating troughs of the disc from the level of the lubricant again flew out of these little troughs, before the little troughs had reached their uppermost position so that no satisfactory lubrication of the bearing surfaces to be lubricated could be obtained in this way.

It is the object of the invention to completely avoid these disadvantages by partly covering the trough-shaped recesses. Thus, by covering part of the little troughs any premature discharge of the lubricant will be successfully prevented.

According to the invention the little troughs may be covered in such a manner as to open in the scooping direction, the partial covering preferably being effected in such a way as to be most complete on the side turned away from the axle and, in order to satisfy as far as possible the conditions prevailing as a result of the rotating movement, the operative edge of the cover may be given the shape of a sickle or a parabolic curve.

Another feature of the invention consists in the fact that, if there is a plurality of trough-shaped recesses on a scooping-device, the inlet edges of the trough-shaped recesses succeeding each other in the scooping direction, are arranged in stepped relation.

This terrace-like arrangement of the inlet edges will guarantee each of the successive troughs being filled on its passage through the lubricant reservoir, there being no danger of the first trough scooping the lubricant solely, whereas the following troughs will remain empty. For the same purpose also the covers of the troughs following each other in the scooping direction, may be arranged in terrace-like succession.

In order to insure a ready inflow of the lubricant, the device is constructed preferably in such a way that the inlet edge of each trough as well as the operative edge of its cover are also arranged in stepped relation, the surface of the cover of a little trough being flush with the inlet edge of the subsequent trough-shaped recess if a plurality of little troughs is provided.

For the purpose of securing a proper inflow and subsequent outflow of the lubricant, it is also of importance that the operative edges of the covers are turned upward and away from the trough-shaped recesses, this turning up being carried out in accordance with the conditions prevailing during the inflow and outflow as a result of the continuous rotation of the scooping device supporting the little troughs, preferably in such a way that the upwardly turned operative edge of each cover will be highest at about the point where the portion which is covered to a greater extent passes into the portion which is covered to a less extent, whereas from this point the upwardly turned edge gradually tapers off towards the axle as well as away from it, to terminate in the normal surface of the cover.

Another feature of the invention consists in that previous to the inlet edge of the first trough-shaped recess a directing vane is being provided which on the one hand serves to direct the lubricant into the little troughs and on the other hand, will avoid any disturbance of, as well as the formation of foam, in the oil bath in consequence of the lubricating device smoothly entering the oil bath, a fact that in turn is due to the provision of the directing vane.

In order to obtain the same satisfactory operation of the new device in both directions of rotation it is another feature of the invention to construct the scooping device symmetrical on both sides.

The new lubricating arrangement comprising a lubricating little trough which, according to the invention, is partly covered, is particularly well suited for being attached to journal bearings of railway rolling stock, for use in rolling mill roller trains or other bearing parts to be lubricated.

The annexed drawing shows, by way of example, as one embodiment of the invention, a scooping disc designed for use in an axle bearing for railway rolling stock.

Figure 2:
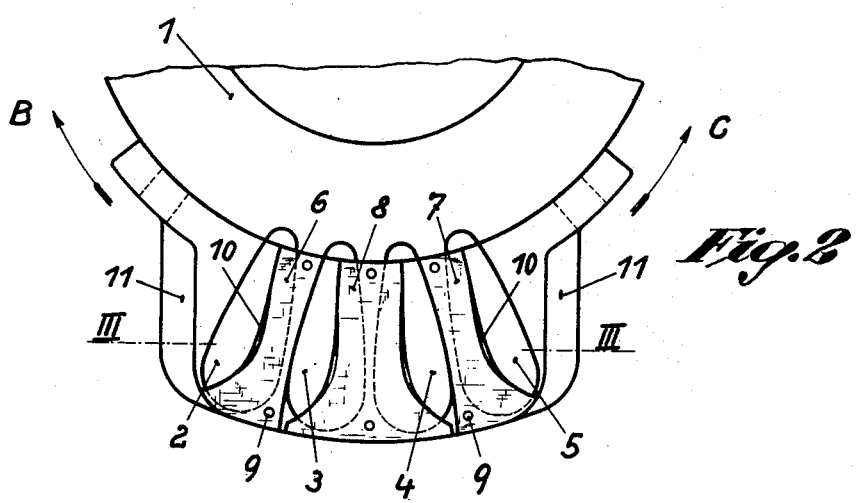
Fig. 2 shows a front view of the scooping disc on an enlarged scale.

The scooping disc 1 is provided with four trough-like recesses 2, 3, 4, 5 of which the little troughs 2 and 3 are operative in the one direction of rotation (direction of arrow B) and the little troughs 4 and 5 in the other direction (direction of arrow A), for the purpose of conveying the lubricant to the bearing portions to be lubricated. The lubricating troughs 2 and 5 are partly covered by the sheet metal plates 6 and 7 in such a way that, according to the direction of rotation, the unobstructed openings of the little troughs lie in the direction of scooping. The same applies to the little troughs 3 and 4 which, by means of a common sheet metal cover 8 are covered in a similar manner. The sheet plates or covers are fixed to the scooping device by means of screws 9 or the like, and, for the sake of clearness, are cross-hatched. As may be seen from Fig. 2 the operative edges of the sheet metal covers 6, 7, and 8 are formed to resemble a sickle in such a way that the little troughs at the side which is turned away from the axle are covered to a greater extent than at the side which is directed towards the axle.

Figure 3:
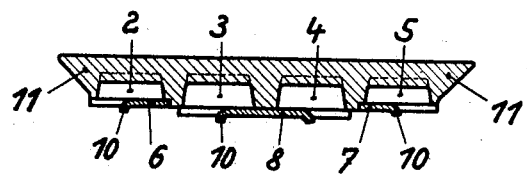
Fig. 3 shows a cross section on line III—III of Fig. 2.

Fig. 3 shows that the inlet edge as well as the operative edge of each little trough are arranged in stepped succession in the direction of scooping and that the inlet edges as well as the covers of the successive little troughs follow each other also in stepped relation, the arrangement in the illustrated embodiment being such that the surface of the cover of the first little trough is flush with the inlet edge of the following little trough. In other words the outer walls of the outer recesses are of lesser height than the walls of the intermediate recesses.

Figure 1:
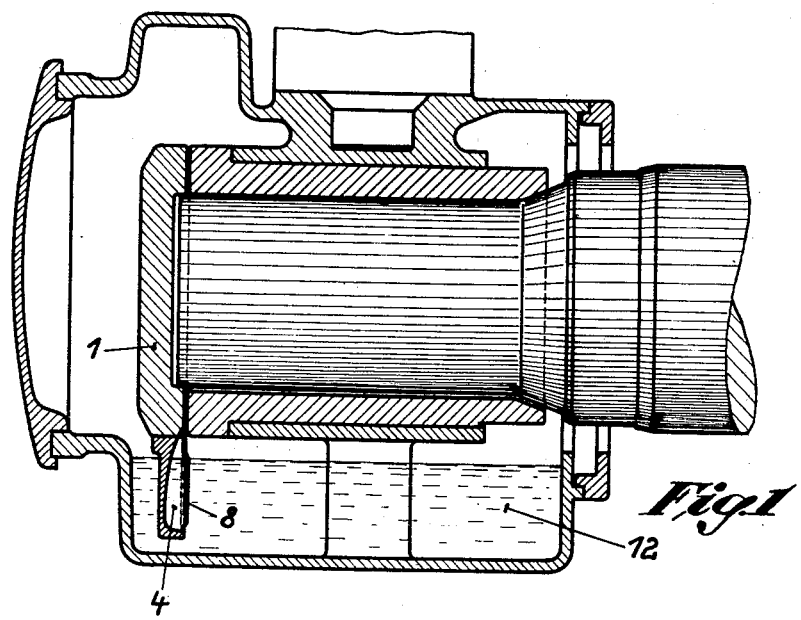
Fig. 1 shows a section through a railway axle bearing with a scooping disc screwed against the journal of the axle.

In order to secure a particularly satisfactory inflow or outflow respectively, of the lubricant into or out of the little troughs, the operative edges of the covers are turned upward at those points where the portion covered to a larger extent passes into that covered to a less extent—in the drawing designated by numeral 10. This turned up part gradually tapers off from point 10 in the both directions, towards the axle as well as away from it, to terminate level with the normal surface of the cover. 11 designates the directing vanes which serve to guide the lubricant to the little troughs and, besides, act to prevent agitation of the oil bath during the passage of the scooping device. In Fig. 1 the level of the lubricating bath is designated by 12.

As will be understood, the covers, instead of being separate sheet metal plates which are fastened by means of screws or in any other way—as shown in the illustrated embodiment,—may also be made integral with the scooping device.

Having thus described my invention what I claim as new and desire to secure by Letters Patent is:

1. Lubricating arrangement according to claim 9 wherein the covers of the trough-shaped recesses succeeding each other in the scooping direction are arranged in stepped relation.

2. Lubricating arrangement according to claim 9 wherein the inlet edge and the operative edge of the cover of each trough-like recess follow each other in stepped relation.

3. Lubricating arrangement according to claim 9 wherein the surface of the cover of the first trough-like recess is flush with the inlet edge of the subsequent trough-like recess.

4. Lubricating arrangement according to claim 9 wherein the operative edges of the covers are turned upwards and away from the trough-shaped recesses.

5. Lubricating arrangement according to claim 9 wherein the operative edges of the covers are turned upwards and away from the trough shaped recesses with the turning up of the operative edge of each cover being highest at about the point where the portion which is covered to a larger extent passes into the portion which is covered to a less extent, whereas from this point it tapers off in both directions, towards the axle as well as away from it, to terminate gradually level with the normal surface of the cover.

6. Lubricating arrangement according to claim 8 wherein a directing vane is provided in advance of the inlet edge of the first trough-shaped recess in the scooping direction.

7. Lubricating arrangement according to claim 8 wherein the scooping vessel, for the purpose of making it possible to supply the lubricant in both directions of rotation, is of symmetrical construction.

8. A lubricating arrangement for use in axle bearings of the type having a lubricant container disposed below the axle bearing, a scooping vessel provided with trough-shaped recesses and arranged to rotate with the axle and to dip into and convey the lubricant from the container to the portions of the bearing to be lubricated, and the outer walls of the outer recesses being of lesser height than the walls of the intermediate recesses.

9. A lubricating arrangement for use in axle bearings of the type having a lubricant container disposed below the axle bearing, a scooping vessel provided with trough-shaped recesses and arranged to rotate with the axle and to dip into and convey the lubricant from the container to the portions of the bearing to be lubricated, and the outer walls of the outer recesses being of lesser height than the walls of the intermediate recesses and increasing in either scooping direction axially in height.

10. A lubricating arrangement for use in axle bearings of the type having a lubricant container disposed below the axle bearing, a scooping vessel provided with trough-shaped recesses and arranged to rotate with the axle and to dip into and convey the lubricant from the container to the portions of the bearing to be lubricated, the outer walls of the outer recesses being of lesser height than the walls of the intermediate recesses and increasing in either scooping direction axially in height, and partial covers for said recesses forming the back edges of said recesses seen in either scooping direction.

11. A lubricating arrangement for use in axle bearings of the type having a lubricant container disposed below the axle bearing, a scooping vessel provided with trough-shaped recesses and arranged to rotate with the axle and to dip into and convey the lubricant from the container to the portions of the bearing to be lubricated, the outer walls of the outer recesses being of lesser height than the walls of the intermediate recesses and increasing in either scooping direction axially in height, and partial covers for the recesses forming the back edge of said recesses seen in either scooping direction and arranged in such a manner as to leave openings open.

12. A lubricating arrangement for use in axle bearings of the type having a lubricant container disposed below the axle bearing, a scooping vessel provided with trough-shaped recesses and arranged to rotate with the axle and to dip into and convey the lubricant from the container to the portions of the bearing to be lubricated, the outer walls of the outer recesses being of lesser height than the walls of the intermediate recesses and increasing in either scooping direction axially in height, and covers forming the back edge of the recesses seen in either scooping direction and partly covering said recesses in such a manner that the covering is most complete at the side turned away from the axle.

EMIL KOCH.